United States Patent
Liu et al.

(10) Patent No.: US 12,542,523 B2
(45) Date of Patent: Feb. 3, 2026

(54) DEVICE AND METHOD FOR ENVELOPE SIGNAL ADJUSTMENT

(71) Applicant: Telefonaktiebolaget LM Ericsson (publ), Stockholm (SE)

(72) Inventors: Peng Liu, Beijing (CN); Danhui Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 608 days.

(21) Appl. No.: 17/917,969

(22) PCT Filed: Apr. 14, 2020

(86) PCT No.: PCT/CN2020/084727
§ 371 (c)(1),
(2) Date: Oct. 10, 2022

(87) PCT Pub. No.: WO2021/207931
PCT Pub. Date: Oct. 21, 2021

(65) Prior Publication Data
US 2023/0128896 A1    Apr. 27, 2023

(51) Int. Cl.
*H03F 3/68* (2006.01)
*H03F 1/02* (2006.01)
(Continued)

(52) U.S. Cl.
CPC ............ *H03F 3/68* (2013.01); *H03F 1/0227* (2013.01); *H03F 3/189* (2013.01); *H03F 3/24* (2013.01);
(Continued)

(58) Field of Classification Search
CPC .......... H03F 3/68; H03F 1/0227; H03F 3/189; H03F 3/24; H03F 2200/102;
(Continued)

(56) References Cited

U.S. PATENT DOCUMENTS 6,049,703 A * 4/2000 Staudinger ............ H03F 1/0222
330/285
9,859,845 B2 * 1/2018 Sarbishaei ................ H03F 3/24
(Continued)

FOREIGN PATENT DOCUMENTS

CN    1893259 A    1/2007
CN    101742627 A    6/2010
(Continued)

OTHER PUBLICATIONS

Communication pursuant to Article 94(3) EPC for European Patent Application No. 20931019.2 dated May 22, 2023 (9 pages).
(Continued)

*Primary Examiner* — Khanh V Nguyen
(74) *Attorney, Agent, or Firm* — Sage Patent Group

(57) ABSTRACT

The present disclosure provides a device and a method for adjusting envelope signals for use by an envelope tracking (ET) enabled power amplifier. The device comprises: a controller configured to calculate a difference between a first amplitude of a first envelope signal received at a first time instance and second amplitude of a second envelope signal received at a second time instance; compare the difference with a predetermined threshold; and adjust an output envelope signal corresponding to the first envelope signal in response to determining that the difference is greater than or equal to the predetermined threshold, such that the output envelope signal is adjusted step-by-step from the second envelope signal to the first envelope signal with each amplitude step being less than or equal to a predetermined amplitude step.

15 Claims, 11 Drawing Sheets

(51) Int. Cl.
*H03F 3/189* (2006.01)
*H03F 3/24* (2006.01)

(52) U.S. Cl.
CPC .. *H03F 2200/102* (2013.01); *H03F 2200/451* (2013.01)

(58) Field of Classification Search
CPC ...... H03F 2200/451; H03F 1/025; H03F 3/04; H03F 1/0244; H03F 1/0211; H03F 2200/504; H03G 3/3042; H03G 3/004
USPC .................................................. 330/127, 297
See application file for complete search history.

(56) References Cited

U.S. PATENT DOCUMENTS

| | | |
|---|---|---|
| 2002/0171484 A1 | 11/2002 | Sundstorm |
| 2007/0008032 A1 | 1/2007 | Kyu et al. |
| 2011/0130106 A1 | 6/2011 | Nagayama et al. |
| 2014/0241462 A1 | 8/2014 | Bellaouar et al. |
| 2017/0373644 A1 | 12/2017 | Gatard et al. |
| 2021/0067097 A1 | 3/2021 | Wang et al. |

FOREIGN PATENT DOCUMENTS

| | | |
|---|---|---|
| CN | 102106078 A | 6/2011 |
| CN | 102196212 A | 9/2011 |
| WO | 2018162746 A1 | 9/2018 |
| WO | 2019165621 A1 | 9/2019 |

OTHER PUBLICATIONS

International Search Report and Written Opinion of the International Searching Authority for PCT International Application No. PCT/CN2020/084727 dated Jan. 12, 2021.

Communication regarding supplementary European Search Report for European Patent Application No. 20931019.2 dated May 8, 2023 (4 pages).

* cited by examiner

600 calculating a difference between a first amplitude of a first envelope signal received at a first time instance and second amplitude of a second envelope signal received at a second time instance which is earlier than the first time instance
S610

comparing the difference with a predetermined threshold
S620

adjusting an output envelope signal corresponding to the first envelope signal in response to determining that the difference is greater than or equal to the predetermined threshold, such that the output envelope signal is adjusted step-by-step from the second envelope signal to the first envelope signal with each amplitude step being less than or equal to a predetermined amplitude step
S630

Fig. 6

DEVICE AND METHOD FOR ENVELOPE SIGNAL ADJUSTMENT

CROSS REFERENCE TO RELATED APPLICATION

This application is a 35 U.S.C. § 371 national stage application of PCT International Application No. PCT/CN2020/084727 filed on Apr. 14, 2020, the disclosure and content of which is incorporated by reference herein in its entirety.

TECHNICAL FIELD

The present disclosure is related to the field of electronic technology, and in particular, to a device and method for adjusting envelope signals.

BACKGROUND

As an important component of a radio frequency (RF) communication circuit, an RF power amplifier is a type of electronic amplifier that converts a low-power RF signal into a higher power signal. In most RF amplifier applications, the efficiency of the amplifier has a significant impact on the design, operation, and efficiency of the overall RF communication system. Power supply requirements, RF amplifier capabilities, and heat-sinks are all affected by the efficiency of the amplifier. Further, with the increased use of battery power systems like smartphones, battery power consumption is a particularly important issue.

For any RF power amplifier, power is supplied to the circuit and a signal is produced. The output will always be less than the DC input power, the ratio of output to DC input being the efficiency.

$$\text{Efficiency} = \frac{\text{RF power output}}{\text{DC power input}} \cdot 100\%$$

The efficiency of an amplifier depends upon several factors including the shape of the waveform and the mode in which it is operating. When operating in a linear mode, the output device must always be in conduction, with the output voltage rising and falling between high and low limits. When operating in this mode, often called Class A, the theoretical maximum efficiency that can be achieved is 50%. However, in a real system, the achieved levels are always below this.

To achieve better efficiency levels, it is possible to drive the amplifier into compression. Much greater levels of efficiency can be achieved, and if a steady waveform, like FM (or frequency modulation), is used, the only degradation of the signal is that additional harmonics of the fundamental carrier are generated and these can be filtered out using RF filters.

Unfortunately, when modulation with an amplitude component is applied to a carrier, this is distorted if it is passed through an amplifier that is run in compression. For data transmission systems that are used today like UMTS (Universal Mobile Telecommunication System), HSPA (High Speed Packet Access), 4G LTE (Long Term Evolution), 5G NR (New Radio), etc., the RF waveforms that are used incorporate an amplitude component in addition to the phase elements and therefore they require a linear amplifier.

The situation becomes worse when the peak to average ratio (or the so-called "crest factor") is high, i.e. the waveform has higher peak levels when compared to the average because the amplifier has to be able to accommodate the peaks while still only running at a low average power level.

During the peaks, the amplifier requires the full voltage to be able to deliver the required power without running into compression, but during the periods of lower signal, this voltage is not required and means that power is dissipated in the device. The amplifier only requires a smaller voltage to deliver the lower levels of power and therefore running with the higher voltage all the time unnecessarily wastes power.

In other words, a conventional RF amplifier designed with a fixed power supply voltage typically operates most efficiently only when operating at its compression point. The amplifiers operating at a constant power supply voltage become less efficient as the crest factor of the signal increases, because the amplifier will spend more time operating at power levels below the peak power level and therefore spend more time operating with sub-optimal efficiency.

SUMMARY

According to an aspect of the present disclosure, a device for adjusting envelope signals for use by an envelope tracking (ET) enabled power amplifier is provided. The device comprises: an input terminal configured to receive envelope signals; an output terminal configured to transmit adjusted envelope signals; a controller electrically coupled to the input terminal and the output terminal, respectively, and configured to: calculate a difference between a first amplitude of a first envelope signal received via the input terminal at a first time instance and second amplitude of a second envelope signal received via the input terminal at a second time instance which is earlier than the first time instance; compare the difference with a predetermined threshold; and adjust an output envelope signal, which is to be output via the output terminal, corresponding to the first envelope signal in response to determining that the difference is greater than or equal to the predetermined threshold, such that the output envelope signal is adjusted step-by-step from the second envelope signal to the first envelope signal with each amplitude step being less than or equal to a predetermined amplitude step.

In some embodiments, at most one amplitude step of the amplitude steps is less than the predetermined amplitude step. In some embodiments, the controller is further configured to: adjust the output envelope signal which starts from the second envelope signal towards the first envelope signal step-by-step with each step being equal to the predetermined amplitude step until the difference between an output amplitude of the output envelope signal and the first amplitude of the first envelope signal is less than the predetermined amplitude step; and adjust the output envelope signal to the first envelope signal if the difference between the output amplitude of the output envelope signal and the first amplitude of the first envelope signal is greater than zero.

In some embodiments, the predetermined threshold is one to ten times the predetermined amplitude step. In some embodiments, the predetermined threshold is about 2 to 4 Volts and the predetermined amplitude step is about 1 Volt. In some embodiments, the envelope signal received is generated from multiple signals for multiple RF branches which share the same ET enabled power amplifier. In some embodiments, the ET enabled power amplifier comprises: a half-bridge ET enabled DC-DC converter configured to receive the adjusted envelope signals; one or more power transistors configured to be controlled by the half-bridge ET enabled DC-DC converter to output voltage signals corresponding to the adjusted envelope signals to an LC filter circuit; and the LC filter circuit configured to filter the voltage signals. In some embodiments, the LC filter circuit is a single-phase Bessel filter circuit.

In some embodiments, the predetermined amplitude step is determined at least partially based on the LC filter circuit. In some embodiments, the one or more power transistors comprise: high side power transistors having input terminals electrically coupled to the half-bridge ET enabled DC-DC converter and output terminals electrically coupled to the LC filter circuit, and configured to be controlled by a high side output signal from the half-bridge ET enabled DC-DC converter; and low side power transistors having input terminals electrically coupled to the half-bridge ET enabled DC-DC converter and output terminals electrically coupled to the LC filter circuit, and configured to be controlled by a low side output signal from the half-bridge ET enabled DC-DC converter. In some embodiments, each of the high side output signal and the low side output signal has a dead time such that the high side power transistors and the low side power transistors are not turned on simultaneously.

In some embodiments, the second time instance is earlier than the first time instance by a sampling period. In some embodiments, the output envelope signal is output for a sampling period at each amplitude step.

According to another aspect of the present disclosure, a method for adjusting envelope signals for use by an ET enabled power amplifier is provided. The method comprises: calculating a difference between a first amplitude of a first envelope signal received at a first time instance and second amplitude of a second envelope signal received at a second time instance which is earlier than the first time instance; comparing the difference with a predetermined threshold; and adjusting an output envelope signal corresponding to the first envelope signal in response to determining that the difference is greater than or equal to the predetermined threshold, such that the output envelope signal is adjusted step-by-step from the second envelope signal to the first envelope signal with each amplitude step being less than or equal to a predetermined amplitude step.

In some embodiments, at most one amplitude step of the amplitude steps is less than the predetermined amplitude step. In some embodiments, the adjusting of the output envelope signal comprises: adjusting the output envelope signal which starts from the second envelope signal towards the first envelope signal step-by-step with each step being equal to the predetermined amplitude step until the difference between an output amplitude of the output envelope signal and the first amplitude of the first envelope signal is less than the predetermined amplitude step; and adjusting the output envelope signal to the first envelope signal if the difference between the output amplitude of the output envelope signal and the first amplitude of the first envelope signal is greater than zero.

In some embodiments, the predetermined threshold is one to ten times the predetermined amplitude step. In some embodiments, the predetermined threshold is about 2 to 4 Volts and the predetermined amplitude step is about 1 Volt. In some embodiments, the envelope signal received is generated from multiple signals for multiple RF branches which share the same envelope tracking enabled power amplifier. In some embodiments, the second time instance is earlier than the first time instance by a sampling period. In some embodiments, the output envelope signal is output for a sampling period at each amplitude step.

According to yet another aspect of the present disclosure, an RF communication circuit is provided. The RF communication circuit comprises: a device as mentioned above; an ET enabled power amplifier electrically coupled to the device and configured to receive envelope signals output from the device and output ET-filtered envelope signals.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

FIG. 6 is a flow chart illustrating an exemplary method for envelope adjustment according to an embodiment of the present disclosure.

DETAILED DESCRIPTION

Figure 1:
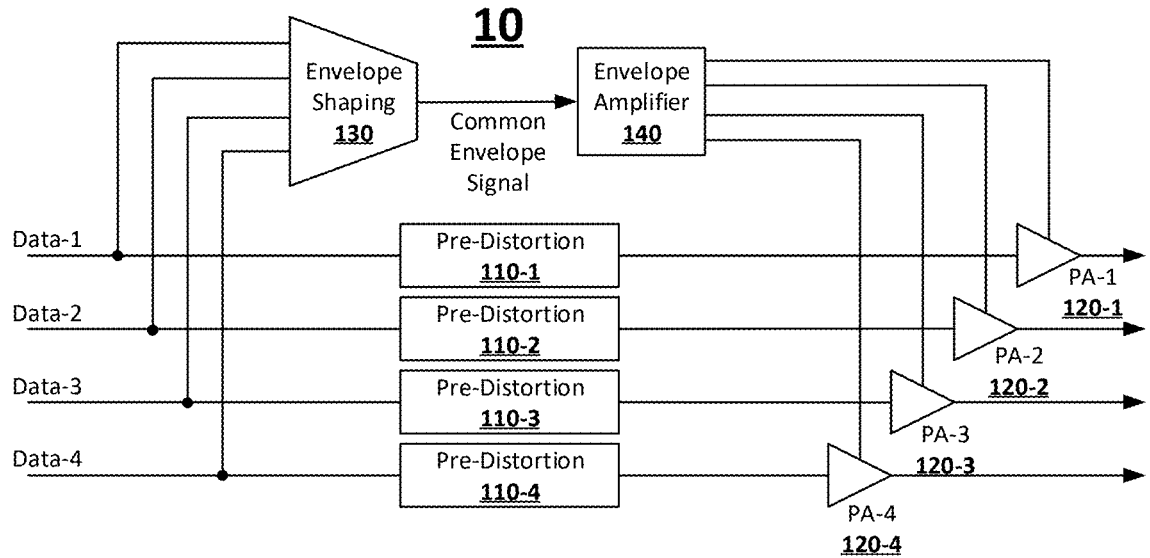
FIG. 1 is a block diagram illustrating an exemplary RF communication circuit according to an embodiment of the present disclosure.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect (s)," "connecting", "connected", etc. when used herein, just means that there is an electrical or communicative connection between two elements and they can be connected either directly or indirectly, unless explicitly stated to the contrary.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

Of course, the present disclosure may be carried out in other specific ways than those herein set forth without departing from the scope and essential characteristics of the disclosure. One or more of the specific processes discussed below may be carried out in any communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the described embodiments, but instead is also capable of numerous rearrangements, modifications, and substitutions without departing from the present disclosure that as will be set forth and defined within the claims.

Further, please note that although the following description of some embodiments of the present disclosure is given in the context of RF communication circuit, the present disclosure is not limited thereto.

RF power amplifiers (PAS) in handsets are typically operated in a classic Class AB configuration, and are only at their highest efficiency when the RF envelope waveform is close to peak power. This is not a problem with such traditional signals as 2G GSM (or Global System for Mobile Communications), where information is encoded only in the phase of the signal—the amplitude is constant, and the PA can operate in this high efficiency mode all the time. GSM PAS consequently have typical efficiencies of 50%-55%. However, as data rates increase from 2G to 3G, 4G, and 5G, the increased spectral efficiency forces information to be encoded in the amplitude, as well as the phase, of the signal. When amplifying RF signals with high crest factors such as 4G LTE or 5G NR waveforms, the average efficiency of the PA drops significantly, with figures of 20-25% being common.

As mentioned above, the ET technology for improving the efficiency of PAS is employed. ET describes an approach for RF amplifier design in which a power supply voltage to be applied to an RF PA may be continuously adjusted to ensure that the RF power amplifier is operating at high efficiency for power required at each instant of transmission. Therefore, with the ET technology, PA efficiency could be increased significantly.

For 5G AAS (or Active Antenna System) product, output power for each single antenna is low, which provides a new technical context for ET application. Traditionally, a DC module needs to be installed per branch (or per stream) in ET. By contrast, for an AAS product, if a DC module is provided for each branch, then the cost will be very high as there are many branches in an MIMO (or Multi-Input-Multi-Output) system, such as 32, 64, or even 128 branches.

To save the cost, a DC sharing solution is proposed for ET in an MIMO system. In such a DC sharing solution, signals are picked up from sharing branches and a common envelope signal is generated as the common tracking signal for PAS in the sharing branches. In this way, removing multiple analog envelope modulators can reduce the overall cost of ET, which gives better feasibility for ET used in the MIMO system.

FIG. 1 is a block diagram illustrating such an exemplary RF communication circuit 10 according to an embodiment of the present disclosure. Please note that the RF communication circuit 10 shown in FIG. 1 is merely a simplified RF communication circuit, and therefore it may comprise components not shown in FIG. 1.

As shown in FIG. 1, the RF communication circuit 10 may comprise input terminals from which data signals (e.g. Data-1, Data-2, Data-3 and Data-4) to be transmitted are provided. Traditionally, the input data signals will be passed to RF power amplifiers (e.g., PA-1 120-1, PA-2 120-2, PA-3 120-3, and PA-4 120-4, or collectively PA 120) directly and then the amplified data signals will be transmitted to antennas for RF transmission. However, to increase the linearity and the efficiency of the RF communication circuit 10, multiple measures are used, for example, PreDistortion (PD) and Envelope Tracking (ET).

As shown in FIG. 1, a Pre-Distortion module or filter (e.g., Pre-Distortion 110-1, Pre-Distortion 110-2, Pre-Distortion 110-3, and Pre-Distortion 110-4, or collectively Pre-Distortion 110) is provided for each branch. Pre-Distortion (PD), also known as Precorrection, is a signal processing technique that compensates for nonlinearities in a transmission system. It works by inverting the measured gain and/or phase distortion of an amplifier (e.g., the PAs 120), and "pre-distorting" the input signal to compensate for the PA distortion, with the goal of achieving a combined response which is linear.

It is important to clarify that PD does not by itself increase efficiency. PD can in some circumstances enable a higher average output power from the PA, if the inherent nonlinearity of the PA is limiting the achievable output power due to Error Vector Magnitude (EVM), noise, or Adjacent Channel Leakage Ratio (ACLR) specifications. This increase in average power would also increase the PA efficiency, but PD does not in itself improve PA efficiency. It is purely a linearization technique. PD also comes in several different flavors, for example, whether the PD is "open loop" or "closed loop" (adaptive).

Open loop PD is a relatively straightforward technique that makes signal corrections based on a static model of the PA distortion, which may have been characterized at design time, or perhaps at factory calibration. Open loop PD is typically implemented as a lookup table indexed by the instantaneous amplitude of the signals, containing correction coefficients derived from the measured gain (AM) and phase (PM) distortion of the PA.

By contrast, closed loop (adaptive) PD involves capturing the output signal from the PA with a measurement receiver, comparing the measurement with the desired signal, and then updating the pre-distortion coefficients based on the measured response. The computational requirements of closed loop PD are dependent on the linearity specifications for the target application, but can be significant as the algorithms needed to adapt the coefficients typically require high precision floating-point matrix mathematics. Although closed loop PD offers significant advantages over open loop PD, particularly in tracking variations in the PA due to temperature and aging effects, it is significantly more difficult to implement, often requiring a high bandwidth A/D converter and memory buffer, and significant computational overhead. The frequency of adaptation is another parameter to explore-some systems can require constant adaptation to keep them stable, while others may only require infrequent adaptations every few minutes.

FIG. 1 shows an open loop PD configuration. However, the present disclosure is not limited thereto. In some embodiments, an RF communication circuit may employ an open loop PD configuration, a closed loop PD configuration, or a combination thereof. However, please also note that the pre-distortion modules 110 may be omitted for cost saving. In other words, the pre-distortion modules 110 are not essential and therefore they are optional components.

Further, as mentioned above, the RF communication circuit 10 may employ a DC sharing solution for ET in an MIMO system to save the cost. Therefore, the RF communication circuit 10 may comprise an envelope shaping module or filter 130 and an envelope amplifier 140. The envelope shaping module 130 is configured to generate a common envelope signal based on the data signals received from the multiple branches (e.g. Data-1, Data-2, Data-3, and Data-4). The envelope amplifier 140 is configured to perform envelope tracking processing on the common envelop signal output by the envelope shaping module 130, and configured to output the ET-processed signal to the RF PAS 120. In other words, the envelope amplifier 140 is configured to adjust the common envelope signal generated by the envelope shaping module 130 such that the signals output to the PAs 120 will operate the PAs 120 at their optimal efficiencies or at least close to their optimal efficiencies.

Please note that in some other embodiments, for example, when only one branch is used or branch sharing is not feasible, the envelope shaping module 130 may be omitted, and therefore there is only one envelope amplifier 140 or there are multiple envelope amplifiers 140 (one for each branch). In such embodiments, the envelope shaping module 130 is an optional component.

Further, please note that although FIG. 1 shows four branches, the present disclosure is not limited thereto. In some other embodiments, a different number of branches may be used, for example, 8, 16, 32, 64 or any other number where appropriate.

Figure 10:
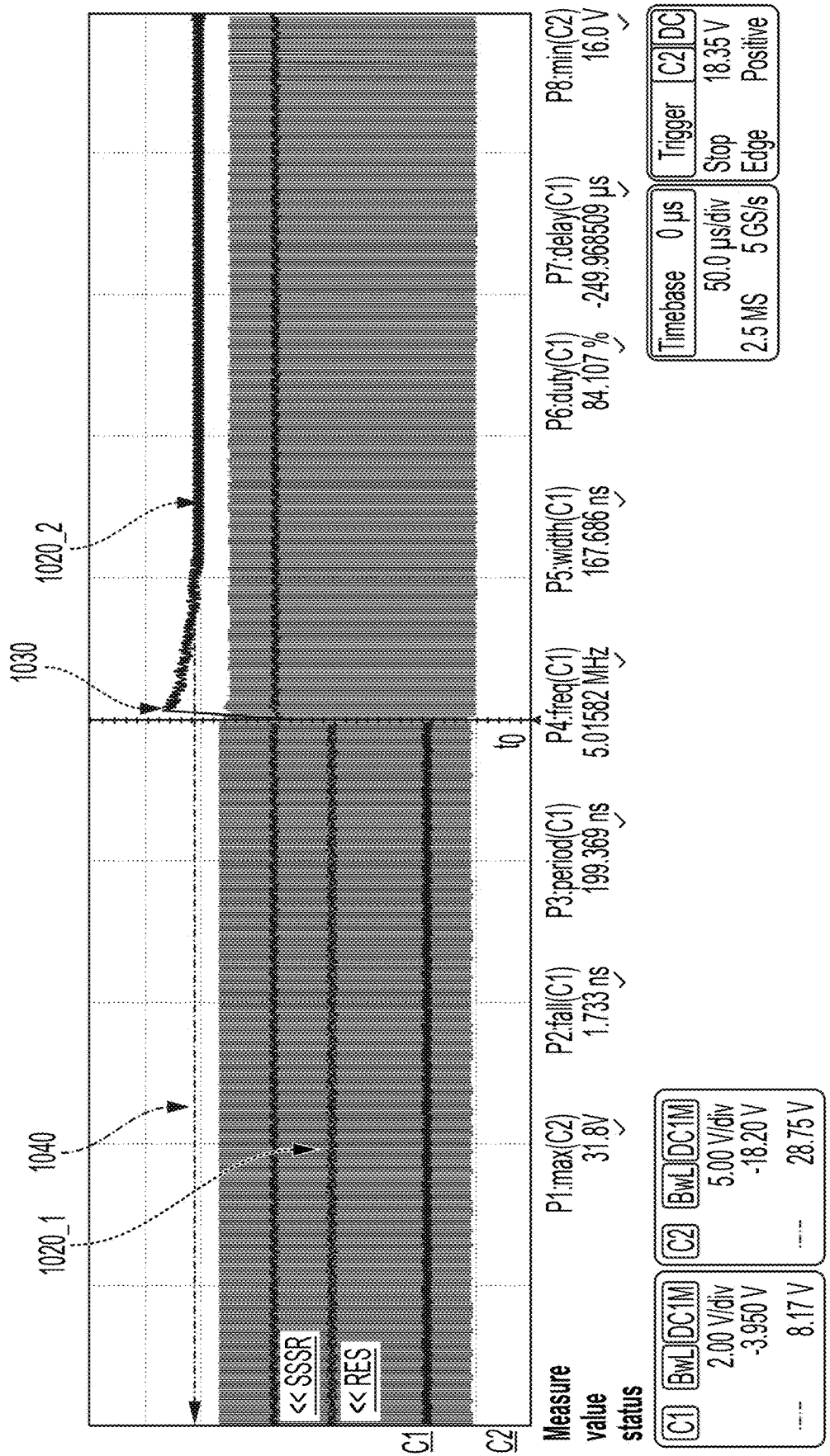
FIG. 10 is a timing diagram illustrating an exemplary envelope signal to be processed by the exemplary envelope adjustment device shown in FIG. 5.

However, in an ET system, such as the RF communication circuit 10 shown in FIG. 1, to track the fast voltage changing, an LC circuit connecting with the DC-DC output (e.g. the output of the envelope amplifier 140) has to be designed to operate with a short time constant, which means inductance and capacitance of the inductors and capacitors in the LC circuit may have small values. As a result, an outstanding issue is caused by this design, that is, the voltage overshoot/undershoot will be great. For example, FIG. 10 shows such an overshoot. To be specific, FIG. 10 is a timing diagram showing an exemplary envelope signal comprising, in the time domain, two portions 1020-1 and 1020-2 which correspond to a duty cycle of 50% and a duty cycle of 85%, respectively. When the duty cycle is changed at to from 50% to 85%, an overshoot indicated by the arrow 1030 occurs, which has a higher voltage than the steady voltage (indicated by the arrow 1040) of the portion 1020-2 of the envelope signal. A sudden high or low voltage will impact the PA performance and even make PAs broken. On the other hand, considering the risk on PA, the LC circuit design has to have an increased time constant and the voltage tracking ability will be seriously degraded. Such an issue will be explained in detail with reference to FIG. 2A and FIG. 2B.

Figure 2A:
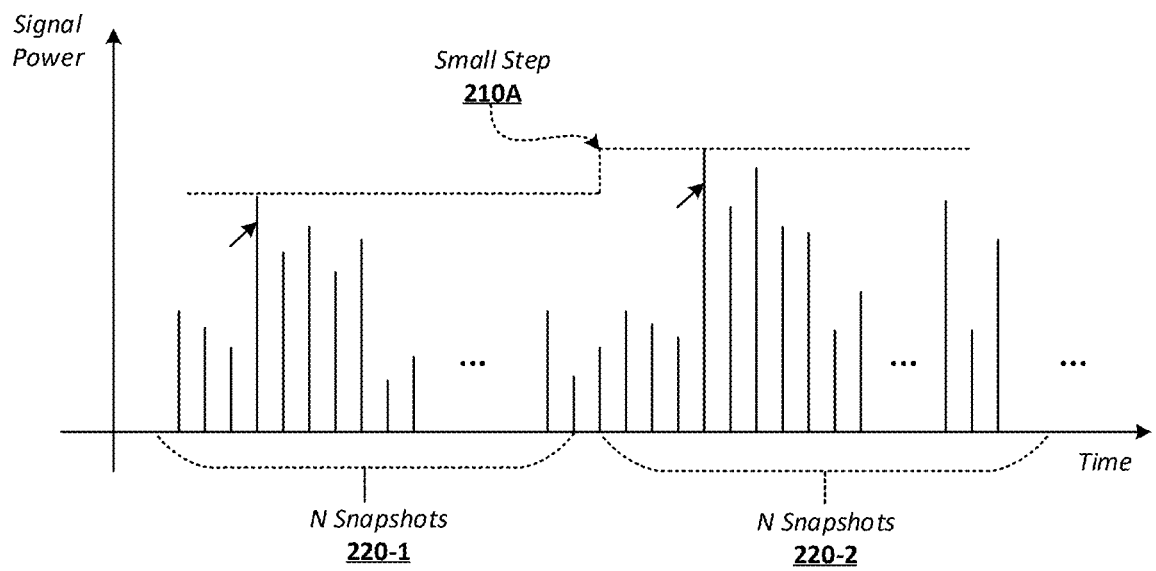
FIG. 2A and FIG. 2B are timing diagrams illustrating exemplary envelope signals with different signal power changes according to some embodiments of the present disclosure.
Figure 2B:
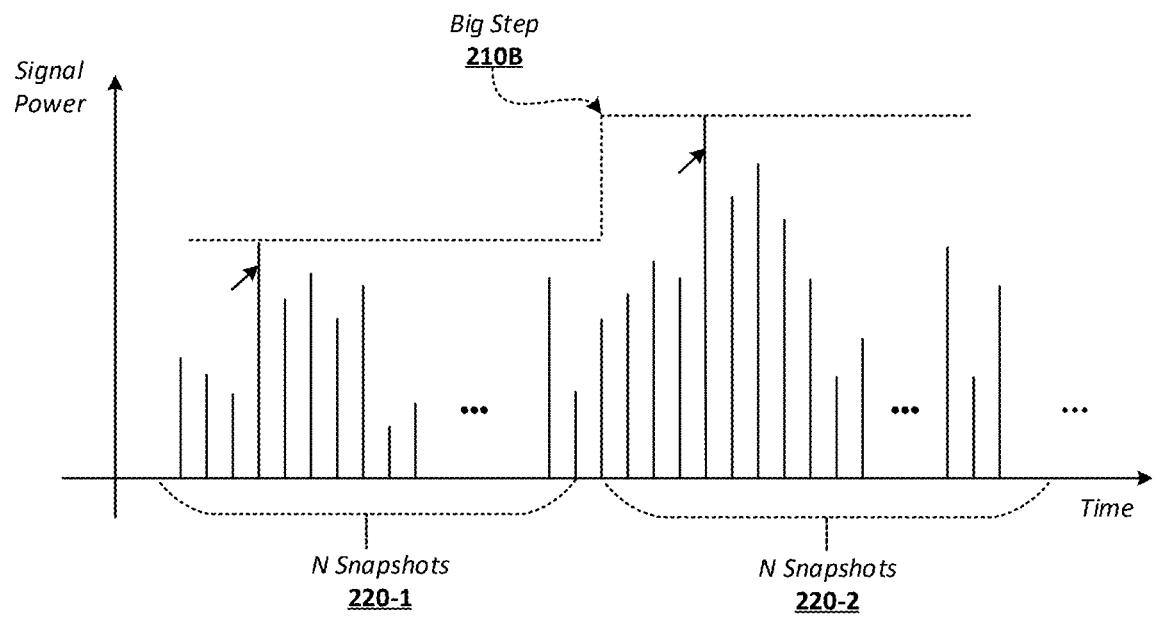

FIG. 2A and FIG. 2B are timing diagrams illustrating exemplary envelope signals with different changes of signal power according to some embodiments of the present disclosure. As shown in FIG. 2A and FIG. 2B, the horizonal axis represents time, and the vertical axis represents power signal of an envelope signal (for example, the common envelope signal shown in FIG. 1). During a sampling period of N snapshots of the envelope signal, a snapshot with the maximum signal power or amplitude is determined from the N snapshots as a (first) reference snapshot, and its signal power or amplitude is determined as the amplitude for the sampling period. For example, as shown in FIG. 2A and FIG. 2B, the fourth snapshot from the left indicated by the arrow is determined as the reference snapshot for the N snapshots 220-1. Similarly, During the next sampling period of N snapshots of the envelope signal, another snapshot with the maximum signal power or amplitude is determined as a (second) reference snapshot, and its signal power or amplitude is determined as the amplitude for the next sampling period. For example, as shown in FIG. 2A and FIG. 2B, the fifth snapshot from the left indicated by the arrow is determined as the reference snapshot for the N snapshots 220-2.

As shown by the arrow 210A in FIG. 2A, the change from the first reference snapshot for the N snapshots 220-1 to the second reference snapshot for the next N snapshots 220-2 is a small step as compared with that indicated by the arrow 210B shown in FIG. 2B. In such a case and as mentioned above, the voltage overshoot/undershoot will be great in the situation shown in FIG. 2B if a fast tracking speed is achieved, whereas the voltage tracking ability will be seriously degraded if a slow tracking speed is achieved to reduce the voltage overshoot/undershoot. In either case, the overall system performance is degraded.

In some embodiments of the present disclosure, to balance the voltage overshoot/undershoot and the tracking speed, a joint optimization method with digital changeable gradient and LC circuit is proposed. For the voltage overshoot/undershoot and tracking speed, the tracking speed is more important for the small step of change of envelope signals, and the overshoot/undershoot cancelation is more important for the big step of change of envelope signals.

To solve or at least partially alleviate the above problems, in some embodiments of the present disclosure, the LC circuit is designed to ensure the overshoot and tracking speed when the envelope signal has a smaller step of change from one sample to the next. When there is big step of change from one sample to the next, the envelope signal will be processed to reduce the step of change. In some embodiments, the big step may be broken into several smaller steps. In each smaller step, the latency is also controlled to ensure any peak can be covered by the voltage of PA. With this gradient adjustment, the voltage overshoot/undershoot caused by the big step of envelope signal can be reduced. Next, the principle of this technique will be explained with reference to FIG. 3.

Figure 3:
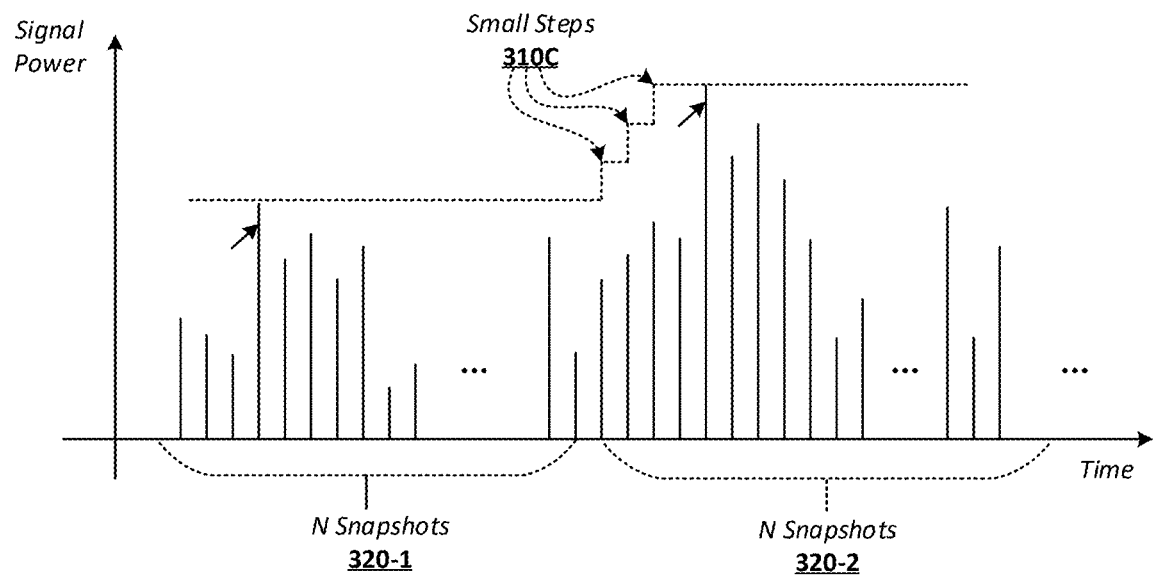
FIG. 3 is a timing diagram illustrating an exemplary envelope signal with reduced steps of signal change according to an embodiment of the present disclosure.

FIG. 3 is a timing diagram illustrating an exemplary envelope signal with reduced steps of signal change according to an embodiment of the present disclosure. FIG. 3 is similar to FIG. 2B in that the overall change from the first reference snapshot to the second reference snapshot is big. However, in the embodiment shown in FIG. 3, the big step is broken into multiple smaller steps as indicated by the arrows 310C. In this way, the overshoot/undershoot caused otherwise by the big step 210B will be significantly reduced by the three smaller steps 310C.

With such an adjustment of the envelope signal, the requirements for LC circuit design are released to some extent because now the LC circuit design may focus on how to process the envelope signals with smaller steps without worrying about the envelope signals with bigger steps which may cause the overshoot or undershoot. This solution may balance the tracking speed and the overshoot/undershoot for various envelope signals while achieving a simple LC circuit design.

Further, with such an ET-enabled solution, the efficiency of the RF PAS will be improved and therefore the overall power consumption is reduced. Some field tests show that the electricity fee per product (e.g. a base station) for five-year operation may be reduced by about 43 Swedish Krona (SEK) or 4.27 US Dollar (USD), and $CO_2$ emission may be reduced by 30 Kg, due to the energy saving caused by this envelope signal adjustment, not to mention the cost down due to the simplified LC circuit design.

Further, the results of some efficiency tests are provided in the table below:

|                | W/O Envelope Adjustment | W/Envelope Adjustment |
|---|---|---|
| PA Eff (%)     | 34.4 | 45.4 |
| DC Eff (%)     | 97   | 96.2 |
| General Eff (%)| 33.37| 43.67|

From the above table, it is clear that although the DC efficiency of the envelope adjustment solution is a bit worse than the one without envelope adjustment by about 0.8% (due to the delay introduced by the breaking of big steps into smaller steps), the general or overall efficiency is significantly improved by about 10.3%.

Figure 4:
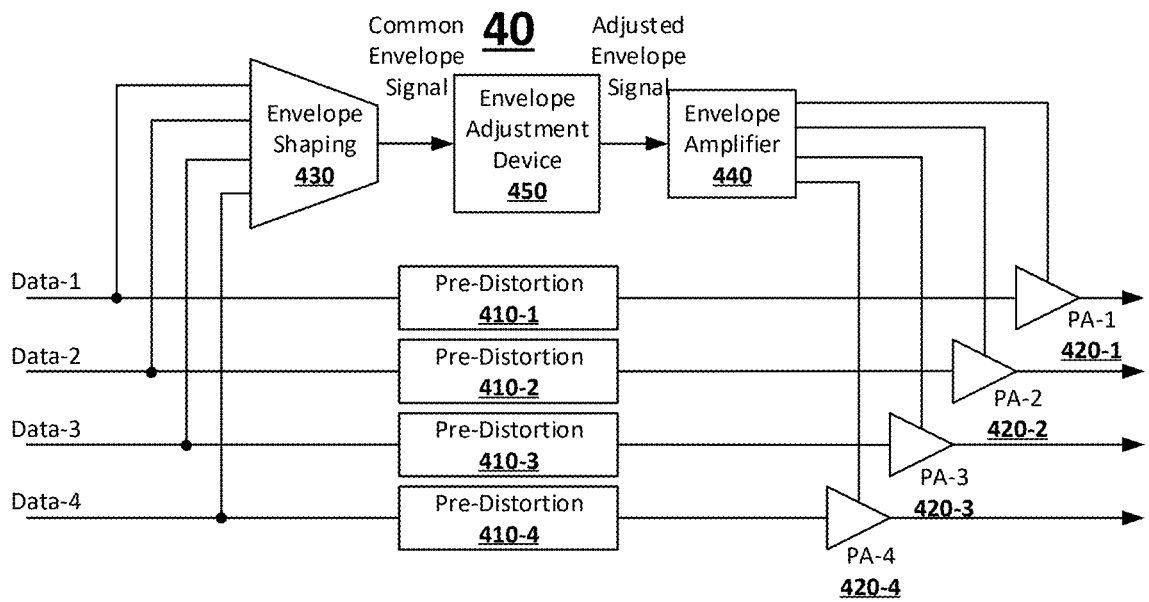
FIG. 4 is a block diagram illustrating an exemplary RF communication circuit according to another embodiment of the present disclosure.

FIG. 4 is a block diagram illustrating another exemplary RF communication circuit 40 according to an embodiment of the present disclosure. The embodiment shown in FIG. 4 differs from that shown in FIG. 1 in that an envelope adjustment device (or module or unit) 450 is added between the envelope shaping module 430 and the envelope amplifier 440. However, the present disclosure is not limited thereto. In some other embodiments, the envelope adjustment device 450 may be incorporated into the envelope shaping module 430 or envelope amplifier 440. Alternatively, its functionalities may be split and a part of its functionalities may be performed by the envelope shaping module 430 and the other part of its functionalities may be performed by the envelope amplifier 440. In other words, in the present disclosure, on which entity (where appropriate) the functionalities described with reference to the envelope adjustment device 450 are implemented is not limited.

In some embodiments, the envelope adjustment device 450 may be configured to perform the operations described with reference to FIG. 3. Next, an exemplary envelope adjustment device as well as a method for envelope adjustment will be described in detail with reference to FIG. 5 and FIG. 6.

Figure 5:
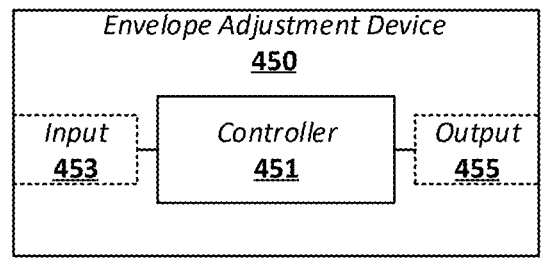
FIG. 5 is a block diagram illustrating an exemplary envelope adjustment device according to an embodiment of the present disclosure.
Figure 7A:
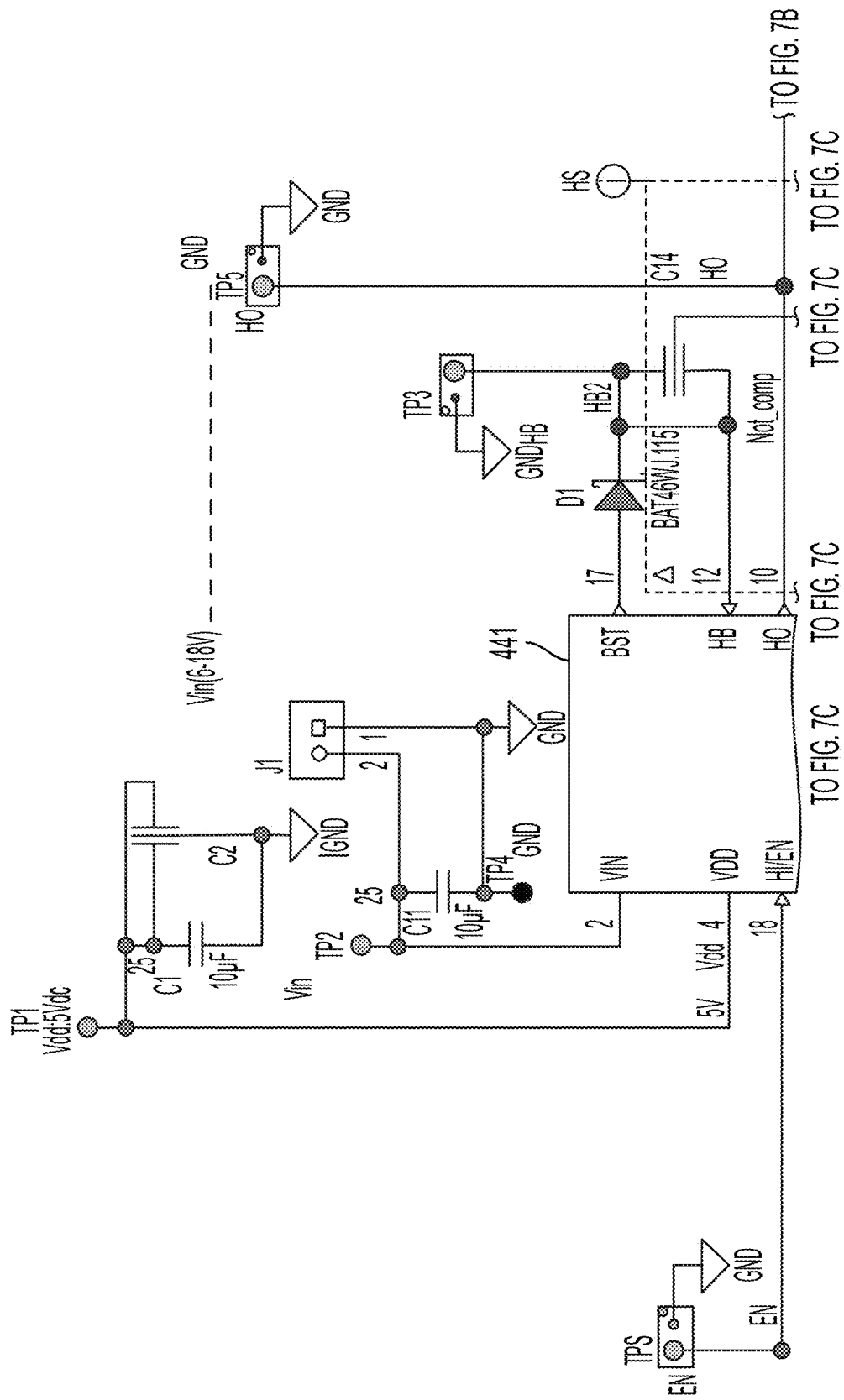
FIGS. 7A-7D are a schematic diagram illustrating an exemplary ET-enabled envelope amplifier according to an embodiment of the present disclosure.
Figure 7B:
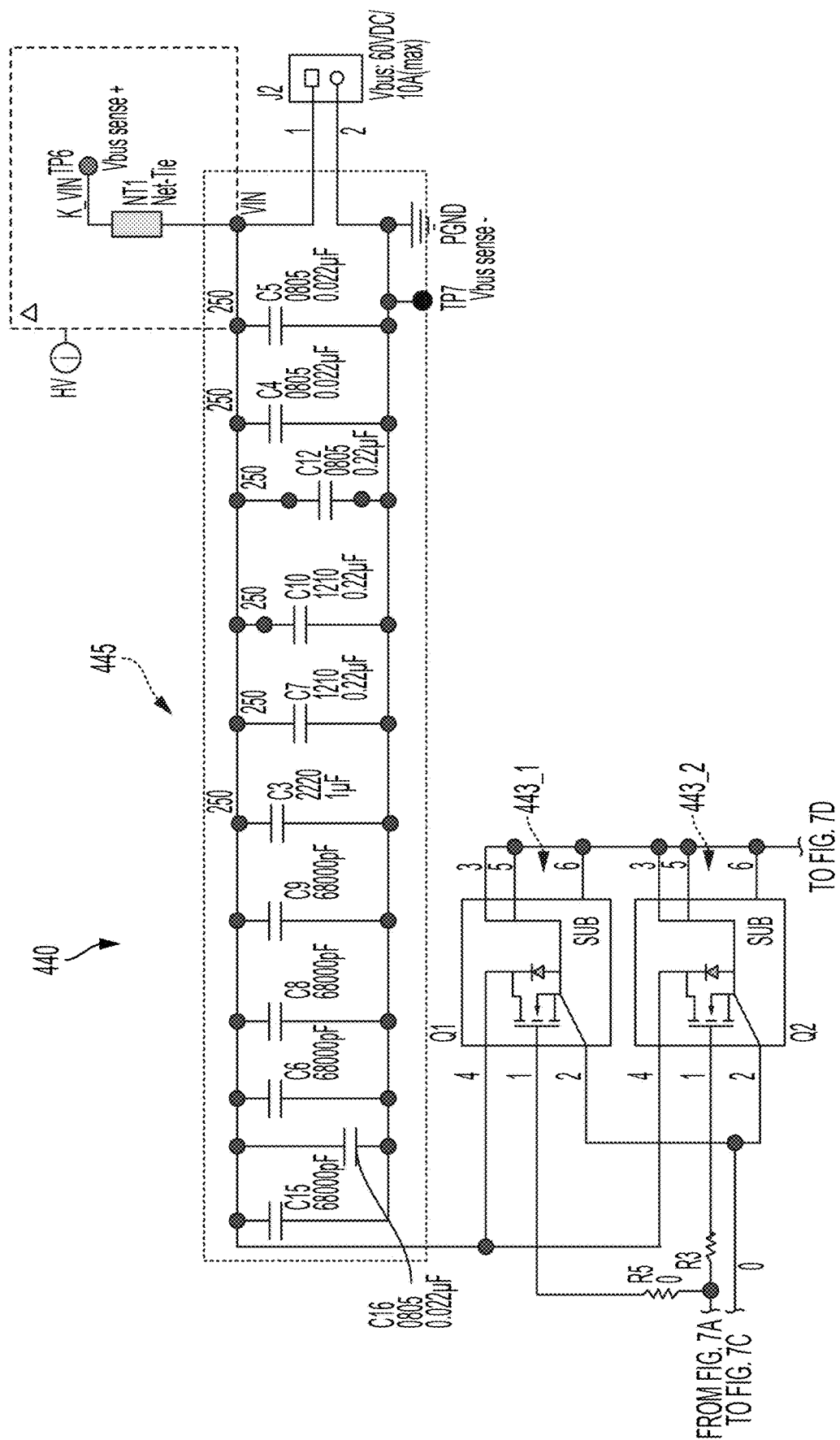
Figure 7C:
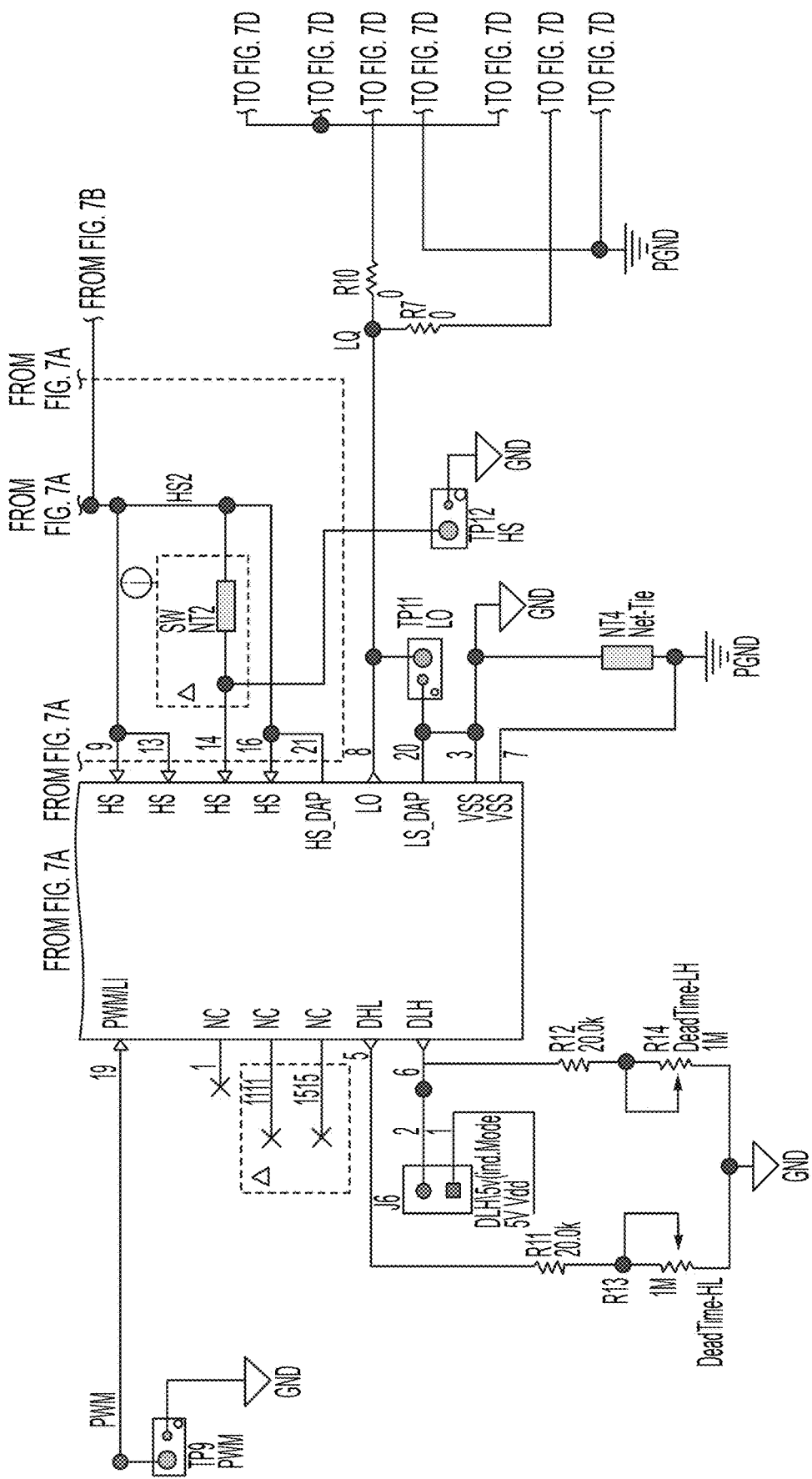
Figure 7D:
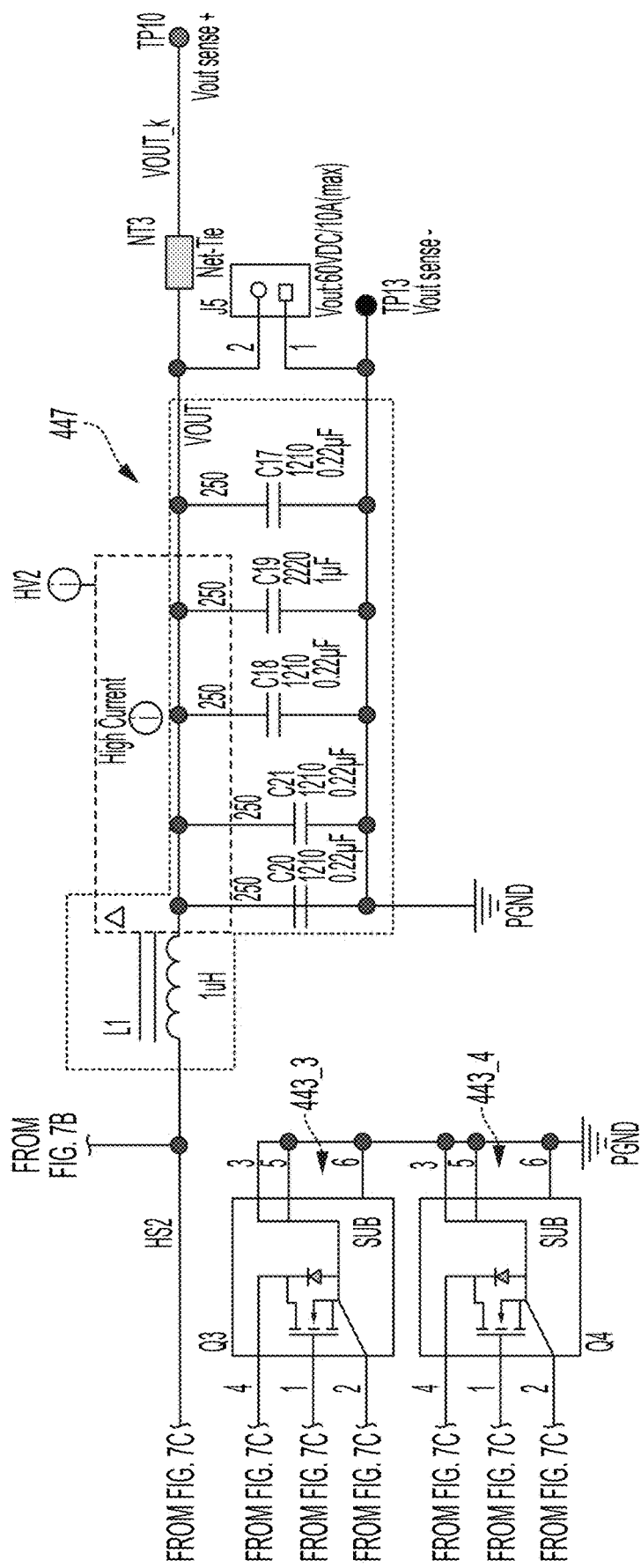

FIG. 5 is a block diagram illustrating an exemplary envelope adjustment device 450 according to an embodiment of the present disclosure. FIG. 6 is a flow chart illustrating an exemplary method 600 for envelope adjustment according to an embodiment of the present disclosure.

As shown in FIG. 5, the device 450 may comprises an input terminal 453, an output terminal 455, and a controller 451. Please note that the input terminal 453 and output terminal 455 are shown as being separated from the controller 451 in FIG. 5. However, the present disclosure is not limited thereto. In some embodiments, the input terminal 453 and/or the output terminal 455 may be parts of the controller 451, for example, data-in/data-out pins of the controller 451.

In some embodiments, the input terminal 453 may be configured to receive envelope signals, such as the common envelop signal shown in FIG. 4. In some embodiments, the output terminal 455 may be configured to transmit adjusted envelope signals, such as the adjusted envelope signal shown in FIG. 4. In some embodiments, the controller 451 may be electrically coupled to the input terminal 453 and the output terminal 455, respectively, as shown in FIG. 5.

As shown at step S610 of FIG. 6, the controller 451 may be configured to calculate a difference between a first amplitude of a first envelope signal received via the input terminal 453 at a first time instance (e.g. the amplitude of the second reference snapshot for the N snapshots 320-2 shown in FIG. 3) and second amplitude of a second envelope signal received via the input terminal 453 at a second time instance which is earlier than the first time instance (e.g. the amplitude of the first reference snapshot for the N snapshots 320-1 shown in FIG. 3).

Further, the controller 451 may be further configured to compare, as shown at step S620 of FIG. 6, the difference with a predetermined threshold, and to adjust, as shown at step S630 of FIG. 6, an output envelope signal, which is to be output via the output terminal 455, corresponding to the first envelope signal in response to determining that the difference is greater than or equal to the predetermined threshold, such that the output envelope signal may be adjusted step-by-step from the second envelope signal to the first envelope signal with each amplitude step being less than or equal to a predetermined amplitude step. In other words, when the step is big enough (e.g. greater than a threshold which is determined based on the corresponding LC circuit design), the step will be broken into several smaller steps.

In some embodiments, at most one amplitude step of the amplitude steps may be less than the predetermined amplitude step. In other words, most of the smaller steps have a same amplitude step as the predetermined amplitude step. To achieve such an effect, the controller 451 may be further configured to adjust the output envelope signal which starts from the second envelope signal towards the first envelope signal step-by-step with each step being equal to the predetermined amplitude step until the difference between an output amplitude of the output envelope signal and the first amplitude of the first envelope signal is less than the predetermined amplitude step. Further, the controller 451 may be further configured to adjust the output envelope signal to the first envelope signal if the difference between the output amplitude of the output envelope signal and the first amplitude of the first envelope signal is greater than zero.

For a specific example, assuming two envelope signals Env(n) and Env(n−1) at time n and n−1 are input to the envelope adjustment device 450, the amplitude difference therebetween is greater than a predetermined threshold, which is one to ten times a predetermined amplitude step, "step" in this embodiment. To implement the envelope adjustment, it starts with changing from Env(n−1) towards Env(n) by one amplitude step, "step":

difference=Env($n$)−(Env($n$−1)+step)

This process is repeated:

difference=Env($n$)−(Env($n$−1)+step+step)

until the remained difference is less than the amplitude step, "step":

Env($n$)=Env($n$−1)+step+step+remained, where remained<step

Finally, the big step is broken into several smaller steps and most of them have a same amplitude step as the predetermined amplitude step, "step", while the remained step may have a zero amplitude or an amplitude less than the predetermined amplitude step, "step". Please note that although in the present embodiment, the predetermined threshold is one to ten times the predetermined amplitude step, "step", the present disclosure is not limited thereto. In some other embodiment, the predetermined threshold may be greater than ten times the predetermined amplitude step, "step".

In some embodiments where the envelope adjustment device 450 may be a part of the envelope amplifier 440 or vice versa, the envelope adjustment device 450 may further comprise other components, for example, those shown in FIGS. 7A-7D and FIG. 8.

Figure 8:
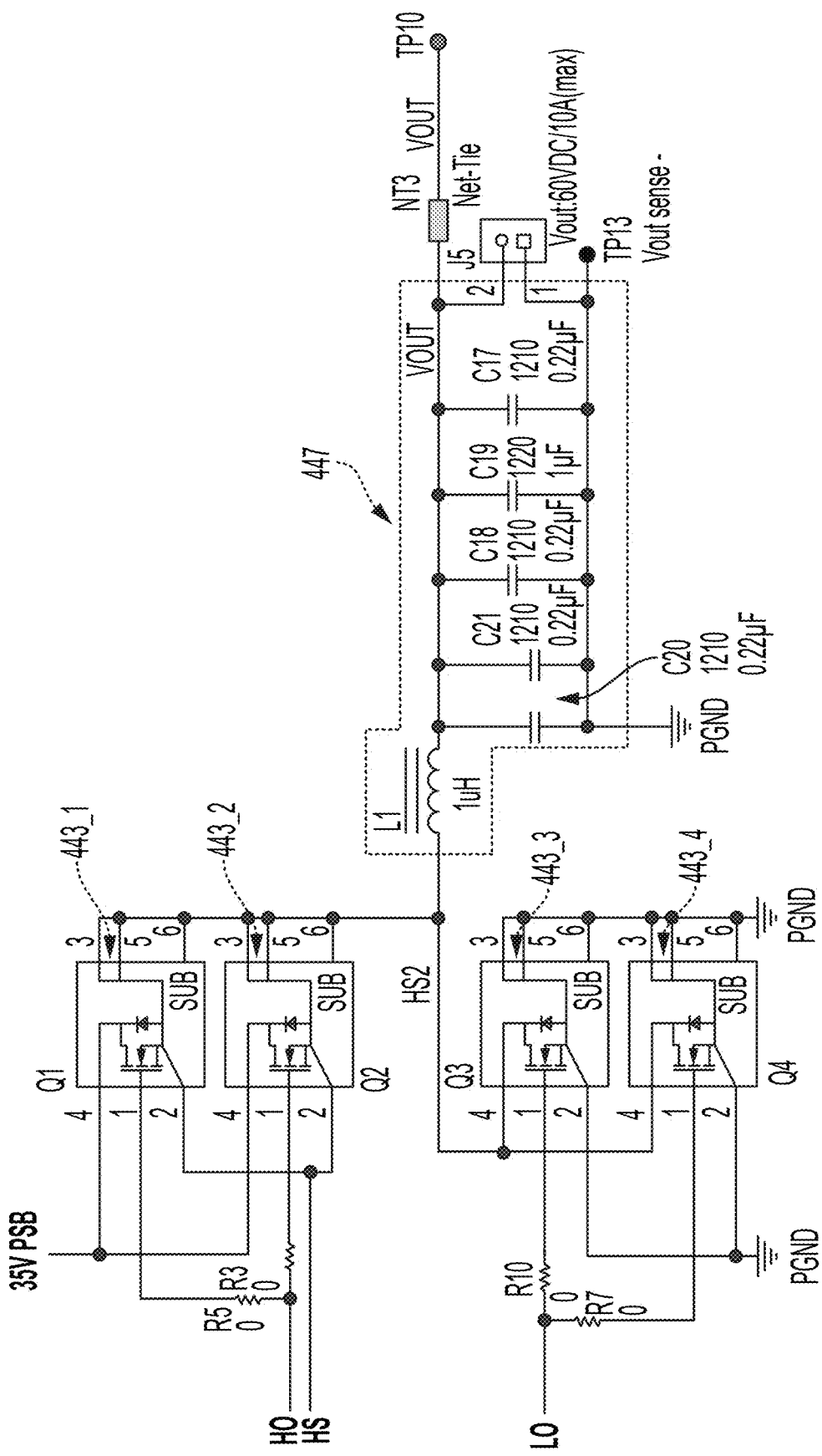
FIG. 8 is an enlarged schematic diagram illustrating a part of the exemplary ET-enabled envelope amplifier shown in FIG. 7.

FIGS. 7A-7D are a schematic diagram illustrating an exemplary ET-enabled envelope amplifier 440 according to an embodiment of the present disclosure, and FIG. 8 is an enlarged schematic diagram illustrating a part of the exemplary ET-enabled envelope amplifier 440 shown in FIGS. 7A-7D.

As mentioned above, the envelope amplifier 440 may be a part of the envelope adjustment device 450 or separated from the envelope adjustment device 450 depending on the design requirements or any other factors.

As shown in FIGS. 7A-7D, the envelope amplifier 440 may comprise a half-bridge ET enabled DC-DC converter 441 configured to receive the adjusted envelope signals, one or more power transistors 443-1, 443-2, 443-3, 443-4 configured to be controlled by the half-bridge ET enabled DC-DC converter 441 to output voltage signals corresponding to the adjusted envelope signals to an LC filter circuit 447, and the LC filter circuit 447 configured to filter the voltage signals.

In some embodiments, the LC filter circuit 447 may be a single-phase Bessel filter circuit which comprises an inductor and multiple capacitors corresponding to different operating frequencies as clearly shown in FIG. 8. Further, as mentioned above, the predetermined amplitude step, "step", may be determined at least partially based on the LC filter circuit 447.

Referring back to FIGS. 7A-7D, in some embodiments, the one or more power transistors 443-1, 443-2, 443-3, and 443-4 may comprise high side power transistors (e.g., 443-1 and 443-2) having input terminals electrically coupled to the half-bridge ET enabled DC-DC converter 441 and output terminals electrically coupled to the LC filter circuit 447, and the high side power transistors may be configured to be controlled by a high side output signal from the half-bridge ET enabled DC-DC converter 441. Further, the one or more power transistors 443-1, 443-2, 443-3, and 443-4 may further comprise low side power transistors (e.g. 443-3 and 443-4) having input terminals electrically coupled to the half-bridge ET enabled DC-DC converter 441 and output terminals electrically coupled to the LC filter circuit 447, and the low side power transistors may be configured to be controlled by a low side output signal from the half-bridge ET enabled DC-DC converter 441. Please note that although FIGS. 7A-7D show four power transistors 443-1, 443-2, 443-3, and 443-4, the present disclosure is not limited thereto. In some other embodiments, a different number of power transistors may be used.

In some embodiments, each of the high side output signal and the low side output signal may have a dead time such that the high side power transistors 443-1 and 443-2 and the low side power transistors 443-3 and 443-4 are not turned on simultaneously. Therefore, the high side power transistors and the low side power transistors will not be turned on simultaneously, which may otherwise cause damages to the circuit.

In general, the envelope amplifier 440 may be controlled by the adjusted envelope signal to provide ET-processed DC voltage to the RF PAS (e.g. PAs 420 shown in FIG. 4), and therefore the envelope tracking is achieved with a fast tracking speed and reduced overshoot/undershoot.

Further, in some embodiments, the switching frequency of the half-bridge ET enabled DC-DC converter 441 could be up to 50 MHz. However, the present disclosure is not limited thereto. In some other embodiments, the switching frequency may be initially set as 5 MHz and the envelope signal may be set as 1 MHz.

Further, with regard to the configuration of the LC circuit 447, to be able to present all the filter design and performance in a compact and useful way, the concept of normalization and scaling may be typically used in filter design. Basically, through the normalization, all the filters, no matter whether they are low-pass, high-pass, band-pass, or even band-stop, will be generated based on appropriate low-pass prototypes that are normalized to a cut-off frequency of 1 rad/s=0.159 Hz and for a load resistor of 1Ω.

In some embodiment of the present disclosure, the LC circuit 447 may be set as a single-phase Bessel filter because Bessel filters are in general more preferred to Butterworth and Chebyshev because of its constant group delay or linear phase response. In some embodiments, based on the operation principle of the low-pass Bessel filter, it can be determined that the inductor used in the LC circuit 447 may be a 1-µH, 9-A inductor (indicated by "L1" in FIG. 8). Further, in some embodiments, it can also be determined that a 1.88 uF output capacitor may be used to reduce the PAVDD output voltage ripple because the system needs a stable ripple for ensure performance. However, the 1.88 uH output capacitor may be eliminated in some embodiments. For example, it is omitted from the LC filter circuit 447 shown in FIGS. 7A-7D and FIG. 8.

Figure 9:
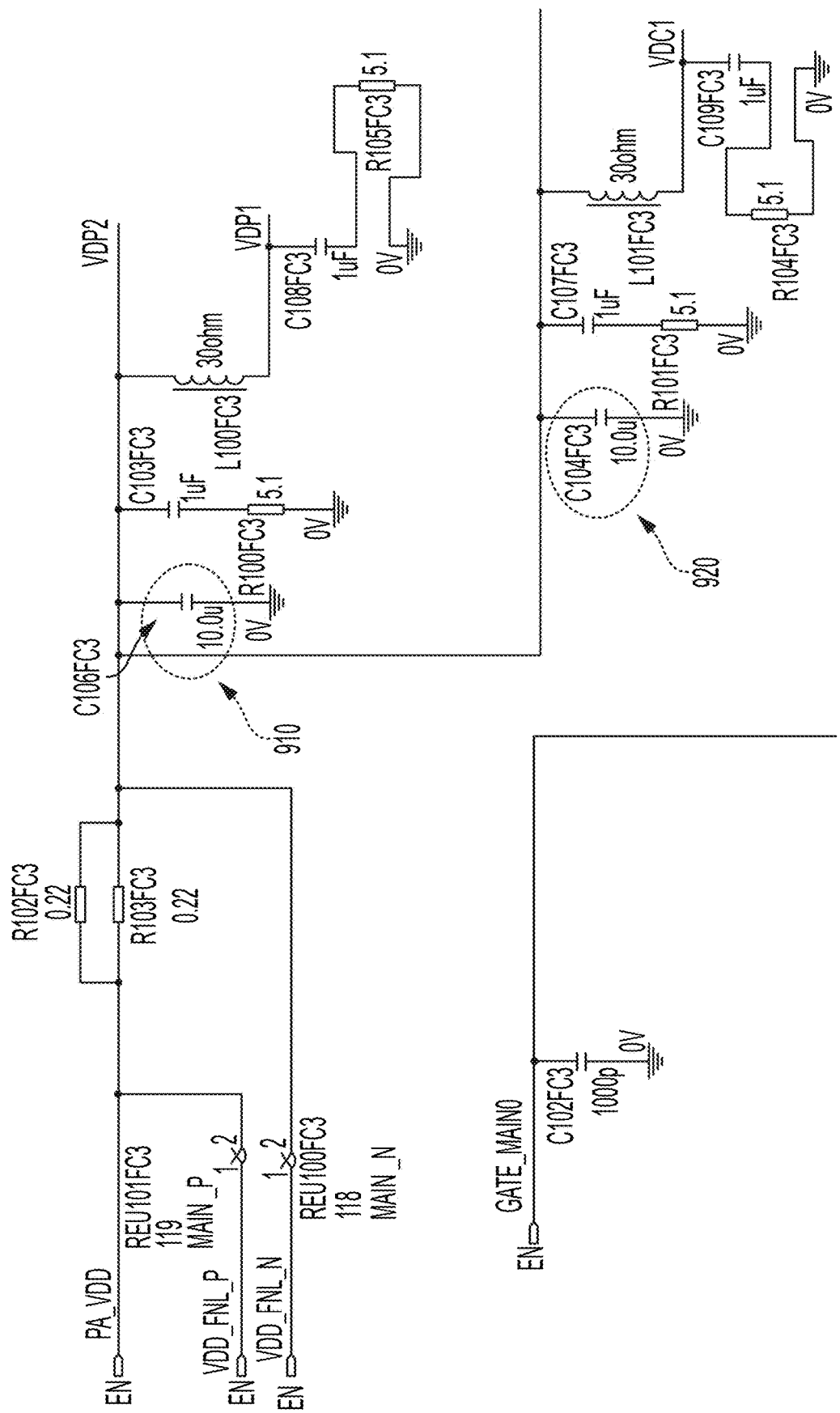
FIG. 9 is a schematic diagram illustrating a change of decoupling capacitors operated together with the envelope adjustment device shown in FIG. 5.

FIG. 9 is a schematic diagram illustrating a change of decoupling capacitors operated together with the envelope adjustment device 450 shown in FIG. 5. As shown in FIG. 9, without the envelope adjustment, an RF PA (e.g. PAs 120 shown in FIG. 1) may have local decoupling capacitors, e.g., two capacitors 910 and 920, each having a 10 uF capacitance and a total 10 uF*2=20 uF, as shown in FIG. 9. With the envelope adjustment, these decoupling capacitors may be removed, thereby ensuring the fast tracking speed.

Therefore, it is clear from the above description of FIG. 3 through FIG. 9 that the envelope adjustment solution may achieve a higher efficiency of PAs while reducing the overshoot/undershoot caused by a fast tracking speed, and also that the design of the LC circuit and RF PAs may be simplified. In other words, the cost for manufacturing and operating a device comprising such an RF communication circuit 40 may be significantly reduced.

The disclosure has been described with reference to embodiments and drawings. It should be understood that various modifications, alternations and additions can be made by those skilled in the art without departing from the spirits and scope of the disclosure. Therefore, the scope of the disclosure is not limited to the above particular embodiments but only defined by the claims as attached and equivalents thereof.

What is claimed is:

1. A device for adjusting envelope signals for use by an envelope tracking (ET) enabled power amplifier, the device comprising:
    an input terminal configured to receive envelope signals;
    an output terminal configured to transmit adjusted envelope signals;
    a controller electrically coupled to the input terminal and the output terminal, respectively, and configured to:
        calculate a difference between a first amplitude of a first envelope signal received via the input terminal at a first time instance and second amplitude of a second envelope signal received via the input terminal at a second time instance which is earlier than the first time instance;
        compare the difference with a predetermined threshold difference; and
        adjust an output envelope signal, which is to be output via the output terminal to the ET enabled power amplifier, corresponding to the first envelope signal in response to determining that the difference is greater than or equal to the predetermined threshold difference, such that, when the difference is greater than or equal to the predetermined threshold difference, the output envelope signal is adjusted step-by-step from the second envelope signal to the first envelope signal with each amplitude step being less than or equal to a predetermined amplitude step.

2. The device according to claim 1, wherein at most one amplitude step of the amplitude steps is less than the predetermined amplitude step; and optionally, wherein the controller is further configured to:
    adjust the output envelope signal which starts from the second envelope signal towards the first envelope signal step-by-step with each step being equal to the predetermined amplitude step until the difference between an output amplitude of the output envelope signal and the first amplitude of the first envelope signal is less than the predetermined amplitude step; and
    adjust the output envelope signal to the first envelope signal if the difference between the output amplitude of the output envelope signal and the first amplitude of the first envelope signal is greater than zero.

3. The device according to claim 1, wherein the predetermined threshold difference is one to ten times the predetermined amplitude step; and optionally, wherein the predetermined threshold difference is about 2 to 4 Volts and the predetermined amplitude step is about 1 Volt.

4. The device according to claim 1, wherein the envelope signal received is generated from multiple signals for multiple Radio Frequency (RF) branches which share the same envelope tracking (ET) enabled power amplifier.

5. The device according to claim 1, wherein the ET enabled power amplifier comprises:
    a half-bridge ET enabled DC-DC converter configured to receive the adjusted envelope signals;
    one or more power transistors configured to be controlled by the half-bridge ET enabled DC-DC converter to output voltage signals corresponding to the adjusted envelope signals to an LC filter circuit; and
    the LC filter circuit configured to filter the voltage signals.

6. The device according to claim 5, wherein the LC filter circuit is a single-phase Bessel filter circuit; or wherein the predetermined amplitude step is determined at least partially based on the LC filter circuit.

7. The device according to claim 5, wherein the one or more power transistors comprise:
    high side power transistors having input terminals electrically coupled to the half-bridge ET enabled DC-DC converter and output terminals electrically coupled to the LC filter circuit, and configured to be controlled by a high side output signal from the half-bridge ET enabled DC-DC converter; and
    low side power transistors having input terminals electrically coupled to the half-bridge ET enabled DC-DC converter and output terminals electrically coupled to the LC filter circuit, and configured to be controlled by a low side output signal from the half-bridge ET enabled DC-DC converter.

8. The device according to claim 7, wherein each of the high side output signal and the low side output signal has a dead time such that the high side power transistors and the low side power transistors are not turned on simultaneously.

9. The device according to claim 1, wherein the second time instance is earlier than the first time instance by a sampling period; and optionally, wherein the output envelope signal is output for a sampling period at each amplitude step.

10. A method for adjusting envelope signals for use by an envelope tracking (ET) enabled power amplifier, the method comprising:
calculating a difference between a first amplitude of a first envelope signal received at a first time instance and second amplitude of a second envelope signal received at a second time instance which is earlier than the first time instance;
comparing the difference with a predetermined threshold difference; and
adjusting an output envelope signal, which is to be output to the ET enabled power amplifier, corresponding to the first envelope signal in response to determining that the difference is greater than or equal to the predetermined threshold difference, such that, when the difference is greater than or equal to the predetermined threshold difference, the output envelope signal is adjusted step-by-step from the second envelope signal to the first envelope signal with each amplitude step being less than or equal to a predetermined amplitude step.

11. The method according to claim 10, wherein at most one amplitude step of the amplitude steps is less than the predetermined amplitude step; and optionally, wherein the adjusting of the output envelope signal comprises:
adjusting the output envelope signal which starts from the second envelope signal towards the first envelope signal step-by-step with each step being equal to the predetermined amplitude step until the difference between an output amplitude of the output envelope signal and the first amplitude of the first envelope signal is less than the predetermined amplitude step; and
adjusting the output envelope signal to the first envelope signal if the difference between the output amplitude of the output envelope signal and the first amplitude of the first envelope signal is greater than zero.

12. The method according to claim 10, wherein the predetermined threshold difference is one to ten times the predetermined amplitude step; and optionally, wherein the predetermined threshold difference is about 2 to 4 Volts and the predetermined amplitude step is about 1 Volt.

13. The method according to claim 10, wherein the envelope signal received is generated from multiple signals for multiple Radio Frequency (RF) branches which share the same envelope tracking (ET) enabled power amplifier.

14. The method according to claim 10, wherein the second time instance is earlier than the first time instance by a sampling period; and optionally, wherein the output envelope signal is output for a sampling period at each amplitude step.

15. A Radio Frequency (RF) communication circuit, comprising:
a device according to claim 1;
an Envelope Tracking (ET) enabled power amplifier electrically coupled to the device and configured to receive envelope signals output from the device and output ET-filtered envelope signals.

* * * * *